(12) United States Patent
Fukuoka et al.

(10) Patent No.: US 8,887,360 B2
(45) Date of Patent: Nov. 18, 2014

(54) COMPOSITE WORKING LATHE

(75) Inventors: Michinari Fukuoka, Iwakura (JP); Yukikazu Kitamura, Aichi-pref. (JP); Yukio Morita, Minokamo (JP); Minoru Kitayama, Aichi-pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 521 days.

(21) Appl. No.: 13/318,169

(22) PCT Filed: Jun. 30, 2009

(86) PCT No.: PCT/JP2009/061999
§ 371 (c)(1),
(2), (4) Date: Jan. 10, 2012

(87) PCT Pub. No.: WO2011/001517
PCT Pub. Date: Jan. 6, 2011

(65) Prior Publication Data
US 2012/0103150 A1  May 3, 2012

(51) Int. Cl.
*B23P 23/02* (2006.01)
*B23B 3/16* (2006.01)
*B23B 3/06* (2006.01)
*B23B 29/24* (2006.01)
*B23B 5/40* (2006.01)

(52) U.S. Cl.
CPC ............ *B23B 3/162* (2013.01); *B23B 3/065* (2013.01); *B23B 29/242* (2013.01); *B23B 5/40* (2013.01)
USPC ................. 29/27 C; 29/40; 29/55; 82/121

(58) Field of Classification Search
CPC ................................ B23B 3/162; B23B 3/065
USPC ............ 29/27 R, 27 C, 53, 55, 54, 40, 39; 82/120, 121
See application file for complete search history.

(56) References Cited

U.S. PATENT DOCUMENTS

| | | | | |
|---|---|---|---|---|
| 1,997,944 A | * | 4/1935 | Ogden, Jr. et al. | 132/107 |
| 2,929,386 A | * | 3/1960 | Behr et al. | 132/156 |
| 3,665,937 A | * | 5/1972 | Nakagawa et al. | 132/126 |

(Continued)

FOREIGN PATENT DOCUMENTS

| | | |
|---|---|---|
| JP | 07-500056 A | 1/1995 |
| JP | 2000-015504 A | 1/2000 |

(Continued)

OTHER PUBLICATIONS dictionary definition of the word "comb", from "Merriam-Webster's Collegiate Dictionary, 10$^{th}$ ed.", p. 228, published 1998.*

(Continued)

*Primary Examiner* — Erica E Cadugan
(74) *Attorney, Agent, or Firm* — Renner, Otto, Boisselle & Sklar, LLP

(57) ABSTRACT

A turning tool is arranged at a tool spindle (102) of a composite working lathe (1) to improve working efficiency. A composite working lathe (1) includes a first workpiece headstock (20) placed on a bed (10). A chuck (24) of a workpiece spindle (22) is rotated as holding a workpiece ($K_1$). A tool headstock (100) arranged at a carriage (50) is rotated about B-axis while being linearly moved in the directions of X-axis, Y-axis and Z-axis. The tool headstock (100) operates a mill tool (110) and includes a comb-shaped cutting tool rest (150) having turning tools attached at the opposite side of a housing in a comb-shaped manner, so that turning processing can be performed with tool indexing in a short time.

3 Claims, 14 Drawing Sheets

(56) References Cited

U.S. PATENT DOCUMENTS

| | | | | |
|---|---|---|---|---|
| 4,327,612 | A | * | 5/1982 | Bazuin .......................... 82/120 |
| 4,683,626 | A | * | 8/1987 | Steiner ............................ 29/40 |
| 5,490,307 | A | | 2/1996 | Link |
| 6,311,591 | B1 | * | 11/2001 | Grossmann ................. 29/27 C |
| 6,928,909 | B1 | * | 8/2005 | Akimoto et al. ............. 29/27 C |
| 7,117,773 | B2 | * | 10/2006 | Katoh et al. ................... 82/121 |
| 7,461,441 | B2 | * | 12/2008 | Langerfeld ...................... 29/40 |

FOREIGN PATENT DOCUMENTS

| | | |
|---|---|---|
| JP | 2000-141164 | 5/2000 |
| JP | 2004-114238 A | 4/2004 |
| WO | 93/07981 | 4/1993 |
| WO | 2008/013313 A1 | 1/2008 |

OTHER PUBLICATIONS

Patent Cooperation Treaty, International Preliminary Report on Patentability (English translation), for corresponding International Application No. PCT/JP2009/061999, mailed Jan. 5, 2012.

International Search Report for corresponding International Application No. PCT/JP2009/061999 mailed Aug. 18, 2009.

* cited by examiner

Rotation about B-axis

Rotation about B-axis

COMPOSITE WORKING LATHE

TECHNICAL FIELD

The present invention relates to a composite working lathe including a tool headstock which is capable of being attached with a mill tool, and is equipped with a turning tool.

BACKGROUND ART

It has been known a composite working lathe for performing composite processing on a workpiece held at a workpiece spindle as having a mill tool.

Such a composite working lathe has an automatic tool changer (ATC), and composite processing is performed with a tool appropriate for the processing. The tool is set to a tool spindle by means of ATC.

For tool changing, the tool headstock is moved to an ATC location to automatically change tools. In a case where a processing position is distanced from the ATC location, a problem such as processing efficiency decreases because time for changing tools becomes long.

In disclosure of Patent documents in the following, tools for turning are attached on a tool headstock having a mill tool attached and a turret cutting tool rest is attached thereto.

CITED DOCUMENT

Patent Document

[Patent Document 1]
Japanese Patent Application Laid-Open No. 2004-114238
[Patent Document 2]:
Japanese Patent Application Laid-Open No. 07-500056

DISCLOSURE OF THE INVENTION

Problems to be Solved by the Invention

An object of the present invention is to provide a composite working lathe capable of mounting more turning tools with a simple structure by arranging a comb-shaped cutting tool rest on a tool headstock.

Means for Solving the Problems

To achieve the above object, a composite working lathe of the present invention includes, as basic means, a bed, a workpiece headstock which is placed at one end of the bed and which includes a workpiece spindle rotating as holding a workpiece, and a tool headstock which is moved in the direction of Z-axis being the direction of an axis line of the workpiece headstock, in the direction of X-axis being perpendicular to Z-axis within a plane including Z-axis and in the direction of the Y-axis being perpendicular to a plane formed by Z-axis and X-axis and which is rotated about B-axis being perpendicular to a plane formed by Z-axis and X-axis . Then, the tool headstock includes a tool spindle to which a rotating tool is attached in a replaceable manner and a comb-shaped cutting tool rest which holds a plurality of turning tools in a comb-shaped manner as being arranged at a rear part of the tool spindle.

Further, the plurality of turning tools held at the comb-shaped cutting tool rest is indexed to a processing position by moving the tool headstock in the direction of Y-axis. The comb-shaped cutting tool rest includes a first turning tool rest and a second turning tool rest which are placed at both sides against the axis line of the tool headstock. Further, the comb-shaped cutting tool rest holds an outer-diameter turning tool and an inner-diameter turning tool.

Effects of the Invention

As described above, in the composite working lathe of the present invention, the tool spindle and the comb-shaped cutting tool rest which holds the plurality of turning tools are disposed on the tool headstock which is rotated about B-axis. Accordingly, working efficiency can be improved as shortening time for changing turning tools.

Further, for the turning tools at the comb-shaped cutting tool rest it is possible to easily index another turning tool by moving the tool headstock in the direction of Y-axis. Accordingly, long-time working can be performed.

BEST MODE FOR CARRYING OUT THE INVENTION

Figure 1A:
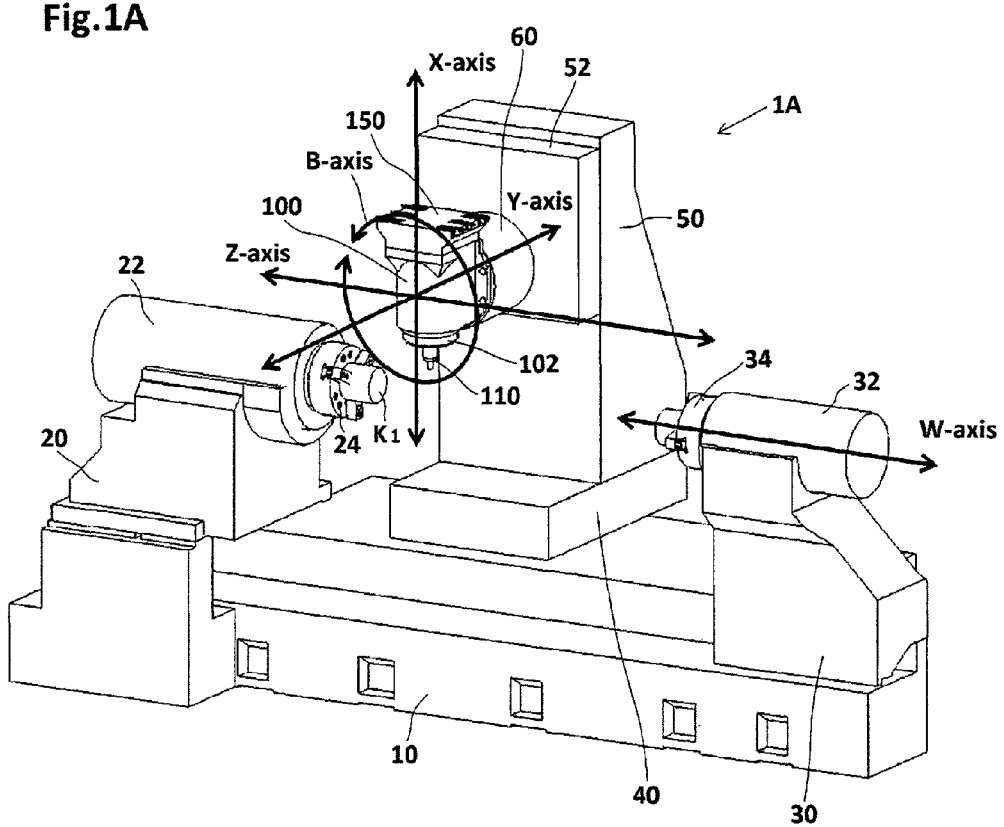
FIG. 1A is an explanatory view illustrating the first mechanical structure of a composite working lathe of the present invention.
Figure 1B:
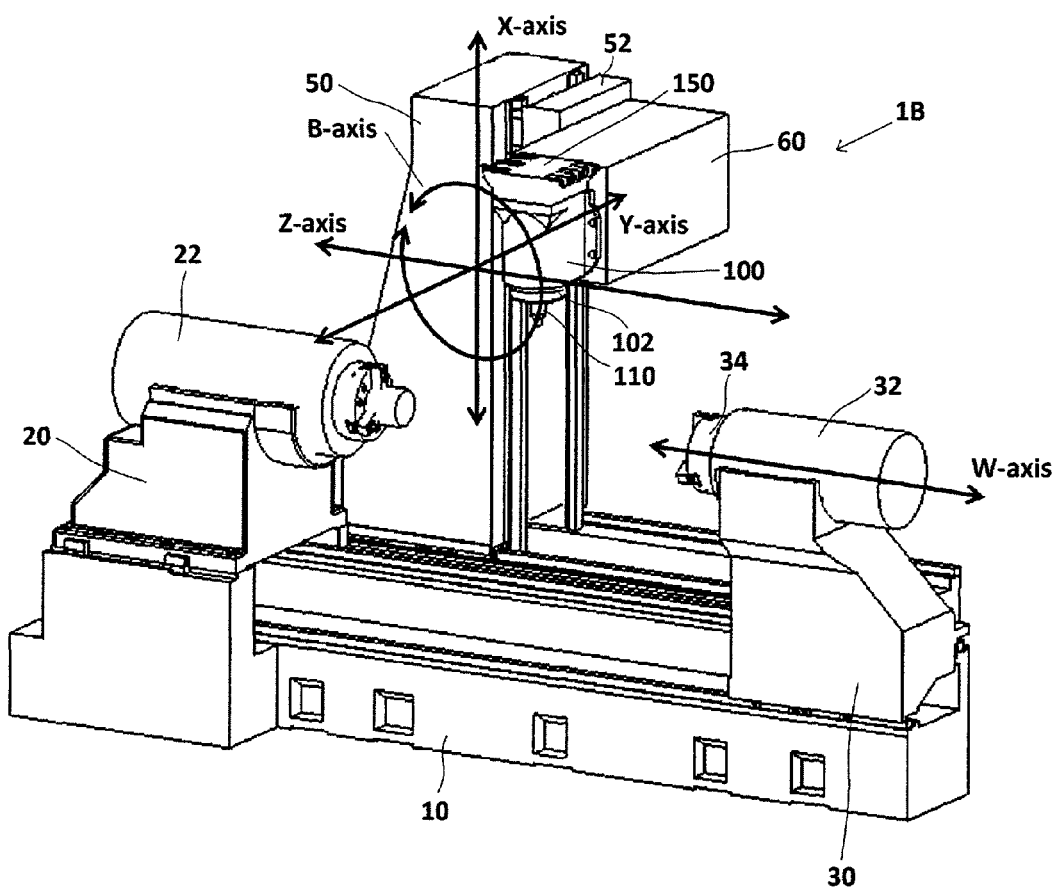
FIG. 1B is an explanatory view illustrating the first mechanical structure of the composite working lathe of the present invention.

FIGS. 1A and 1B are explanatory views illustrating the first mechanical structure of a composite working lathe of the present invention.

A composite working lathe denoted respectively by numerals 1A, 1B as a whole is provided with a first workpiece headstock 20 at one end of a bed 10. The first workpiece headstock 20 is fixed onto the bed 10 and includes a first workpiece spindle 22.

A first workpiece spindle chuck 24 is disposed to the first workpiece spindle 22 to be rotationally driven as holding a workpiece $K_1$. Z-axis is defined on an axial line of the first workpiece spindle 22.

A second workpiece headstock 30 is disposed to the other end of the bed 10 as being faced to the first workpiece headstock 20. The second workpiece headstock 30 is moved on W-axis which is in parallel to Z-axis.

A second workpiece spindle 32 is disposed on the second workpiece headstock 30. A second workpiece spindle chuck 34 holds a workpiece.

In the mechanical structure illustrated in FIG. 1A, a carriage base 40 is disposed onto the bed 10 as being movable on Z-axis. A carriage 50 is disposed onto the carriage base 40.

A slide 52 is movably disposed at a front face of the carriage 50.

The slide 52 is moved in the direction of X-axis which is perpendicular to Z-axis.

A tool spindle base 60 is disposed to the slide 52. The tool spindle base 60 supports a tool headstock 100. The tool headstock 100 includes a tool spindle 102 which rotationally drives a mill tool 110. The tool headstock 100 is capable of being rotated about B-axis which is a rotational axis being perpendicular to a plane formed by X-axis and Z-axis.

Further, the tool headstock 100 is capable of being linearly moved in the direction of Y-axis being perpendicular to the plane formed by X-axis and Z-axis.

In the mechanical structure illustrated in FIG. 1B, the carriage 50 is slid on a rail arranged on the bed.

Figure 2A:
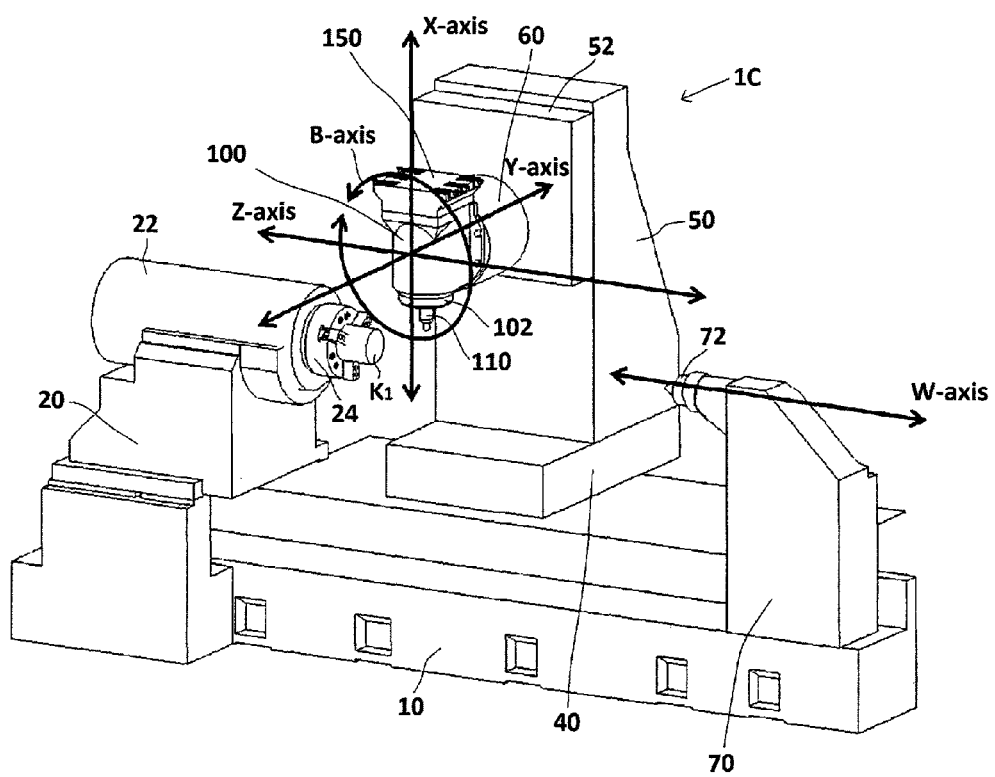
FIG. 2A is an explanatory view illustrating the second mechanical structure of a composite working lathe of the present invention.
Figure 2B:
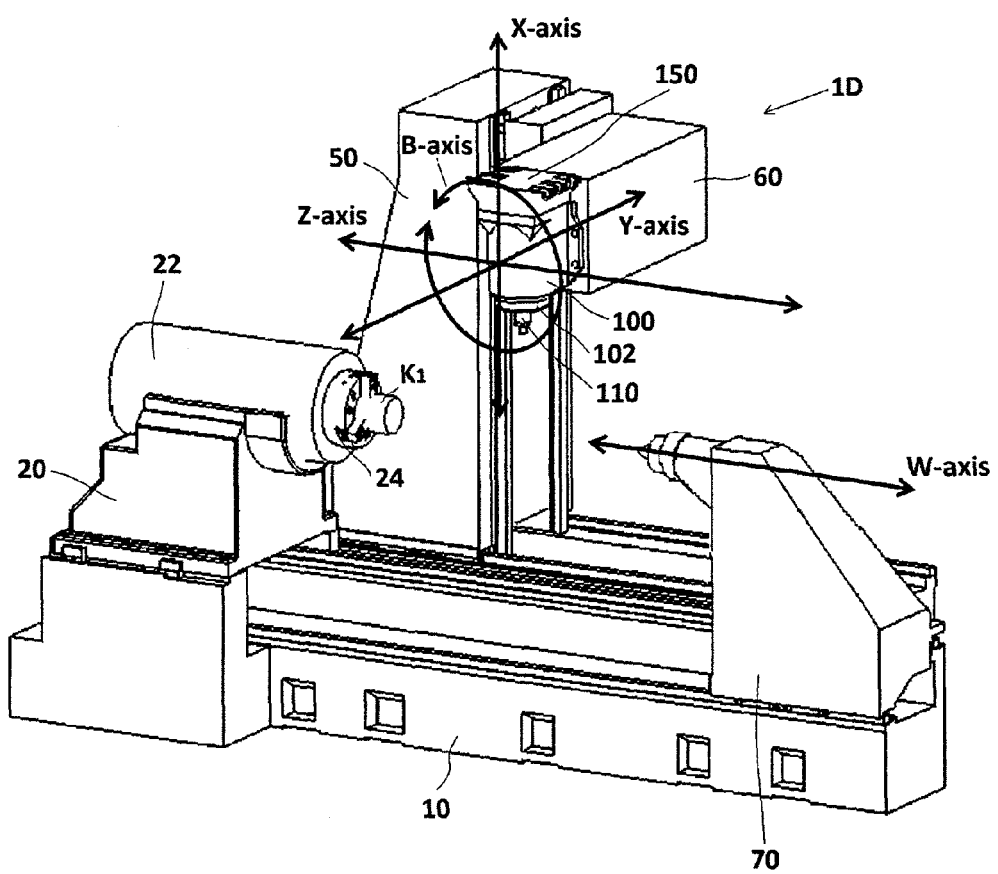
FIG. 2B is an explanatory view illustrating the second mechanical structure of the composite working lathe of the present invention.

FIGS. 2A and 2B are explanatory views illustrating the second mechanical structure of a composite working lathe of the present invention.

A composite working lathe denoted by numeral 1C, 1D as a whole is provided with a first workpiece headstock 20 at one end of a bed 10. The first workpiece headstock 20 is fixed onto the bed 10 and includes a first workpiece spindle 22.

A first workpiece spindle chuck 24 is disposed to the first workpiece spindle 22 to be rotationally driven as holding a workpiece $K_1$. Z-axis is defined on an axial line of the first workpiece spindle 22.

A tailstock 70 is disposed to the other end of the bed 10 as being faced to the first workpiece headstock 20. The tailstock 70 is moved along W-axis which is in parallel to an axis of the first workpiece headstock 20. The tailstock 70 includes a tailstock spindle 72 and performs center pushing of the workpiece $K_1$ which is held at the first workpiece headstock 20.

The rest of the mechanical structure is similar to the mechanical structure of FIGS. 1A and 1B, description thereof will not be repeated as providing the similar numerals.

The composite working lathe is equipped with an ATC which is not illustrated for supplying a mill tool 110 and other tools in a replaceable manner to a tool headstock 100.

Figure 3:
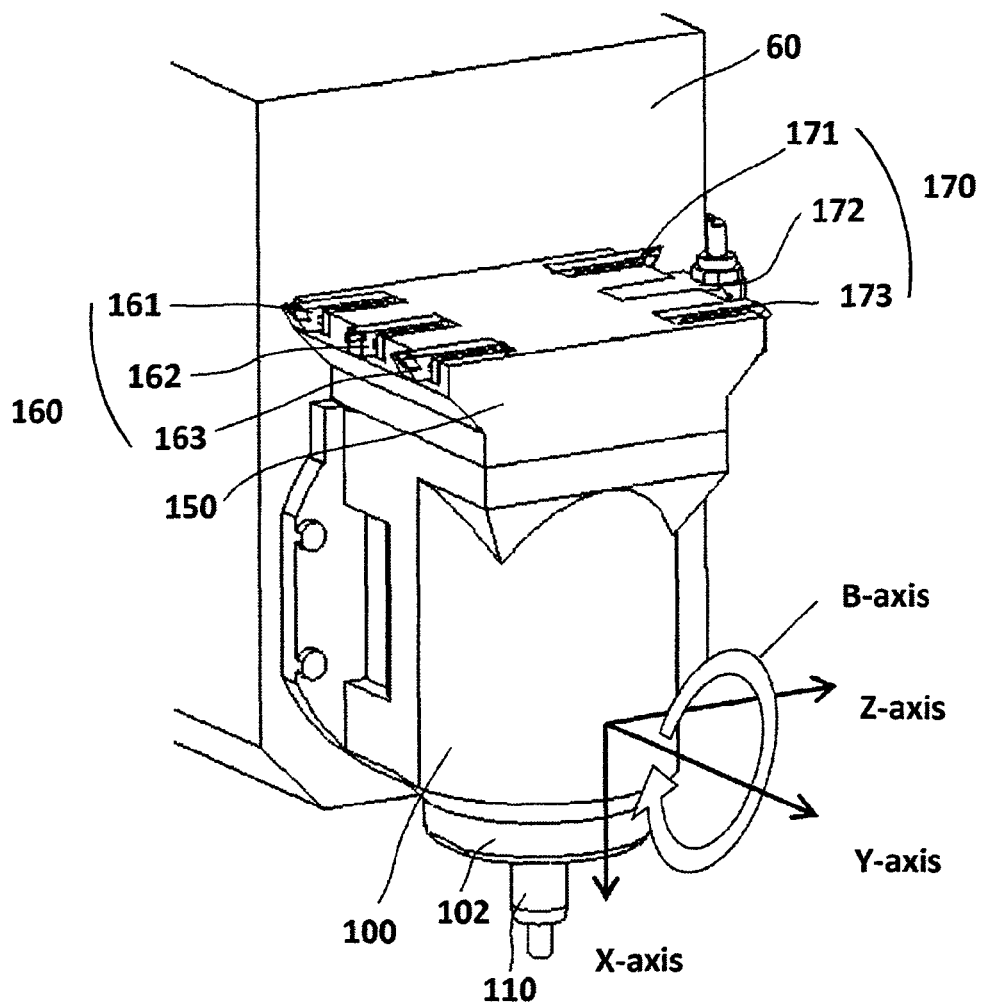
FIG. 3 is a perspective view of a tool headstock.

FIG. 3 is a perspective view of the tool headstock 100 of the present invention. The tool headstock 100 is rotated about B-axis while being linearly moved along X-axis, Y-axis and Z-axis.

The tool headstock 100 includes a tool spindle 102 at one side of a housing, so that the mill tool 110 and the like are attached in a replaceable manner.

A comb-shaped cutting tool rest 150 is disposed on the housing of the tool headstock 100 at the rear part of the tool spindle 102. A first turning tool rest 160 and a second turning tool rest 170 are arranged at the comb-shaped cutting tool rest 150. A plurality of turning tools 161, 162, 163 aligned in the direction of Y-axis are held by the first turning tool rest 160. A plurality of turning tools 171, 172, 173 aligned in the direction of Y-axis are held by the second turning tool rest 170. The turning tools 161, 162, 163, 171, 172, 173 are each received in an opening (having walls 181, 181) between adjacent ones of the comb-tooth-like portions 180.

Figure 4:
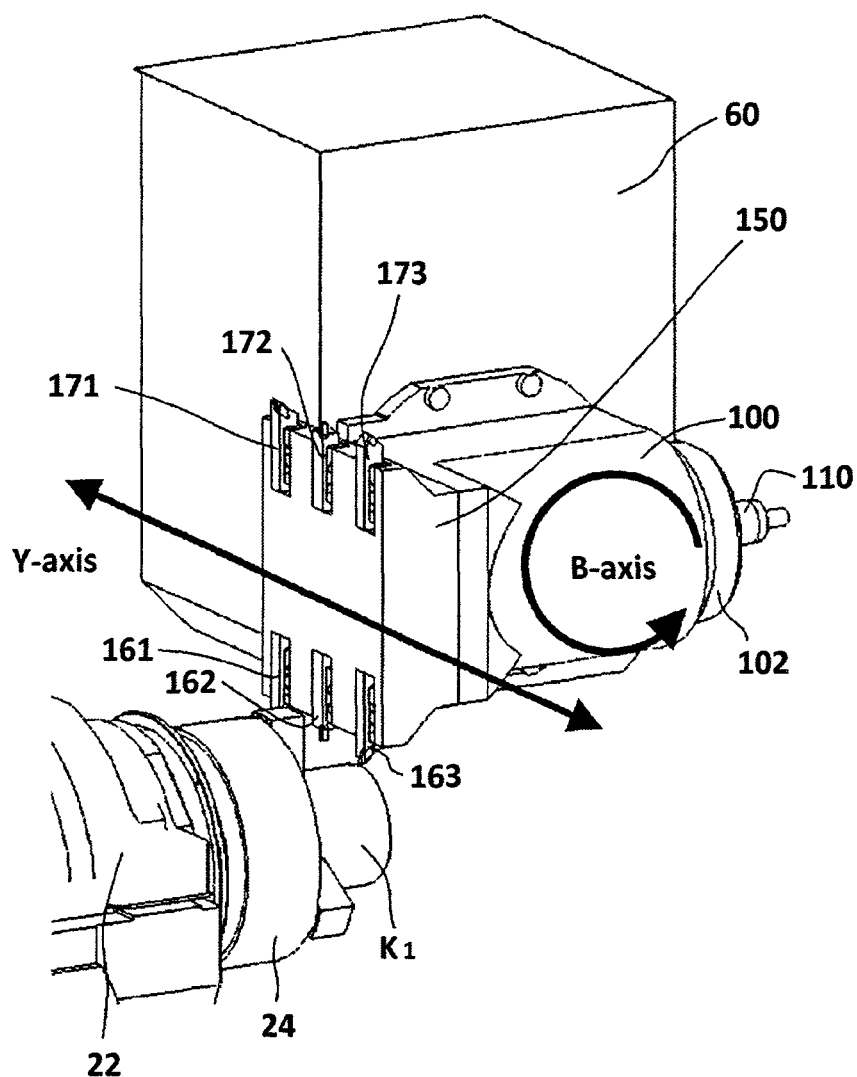
FIG. 4 is an explanatory view of a comb-shaped cutting tool rest.

FIG. 4 is an explanatory view illustrating a state in which outer diameter processing is performed on the workpiece $K_1$ held by the first workpiece spindle chuck 24 of the first workpiece spindle 22 with the turning tool 163 arranged at the comb-shaped cutting tool rest 150. The turning tool 163 is faced to the workpiece $K_1$ by rotating the tool headstock 100 about B-axis by 90 degrees and the outer diameter processing is performed. The turning tools 162, 161 can be selected by moving the tool headstock 100 in the direction of Y-axis.

Figure 5:
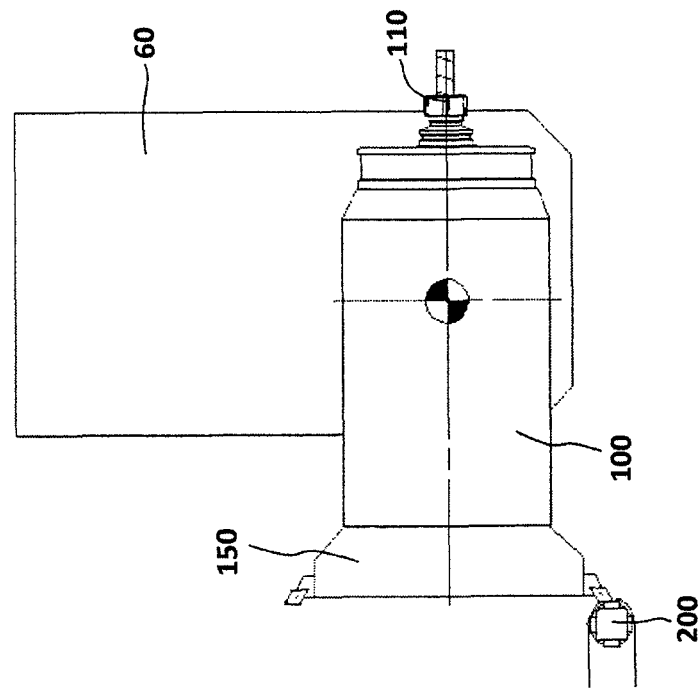
FIG. 5 is an explanatory view of an automatic edge position measuring device.
Figure 5:
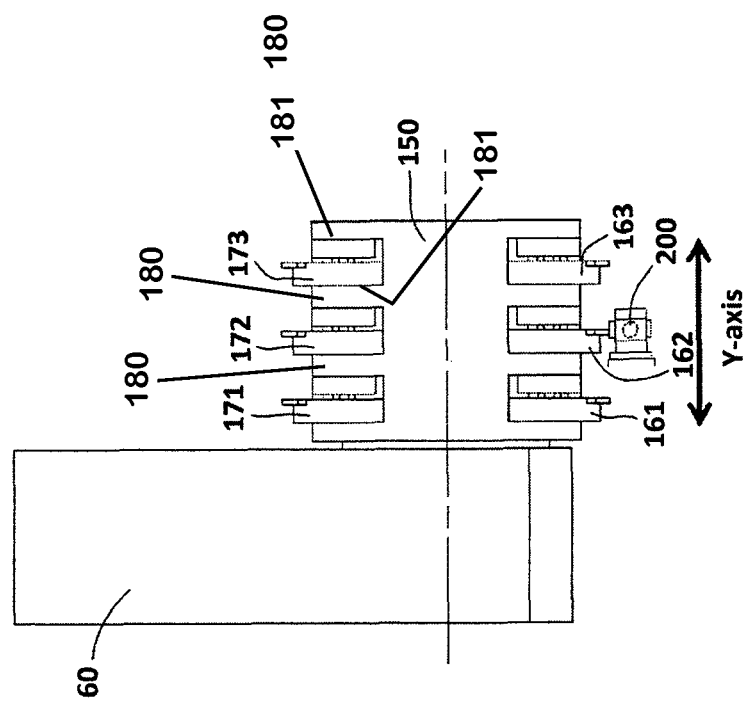

FIG. 5 illustrates a state in which data of tool edge positions of the turning tools 161, 162, 163, 171, 172, 173 arranged at the comb-shaped cutting tool rest 150 are taken into an NC control apparatus by measuring with an automatic edge position measuring device 200.

The automatic edge position measuring device 200 is retracted to the outside of the machining area during processing.

Figure 6:
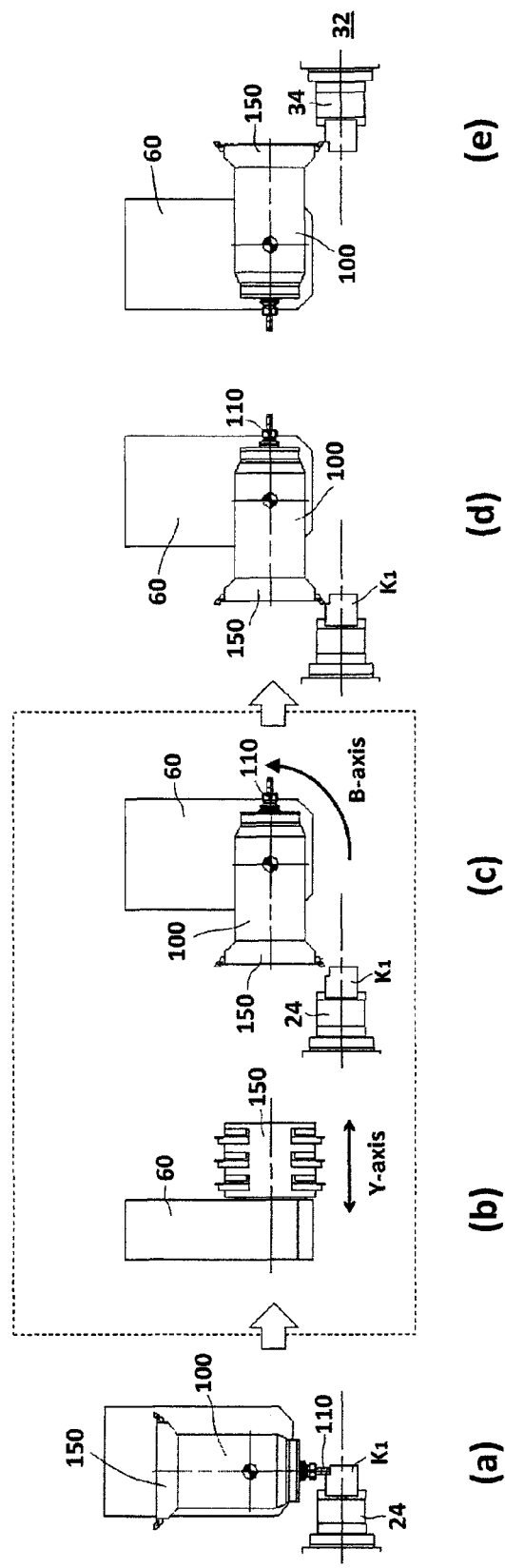
FIG. 6 is an explanatory view of the tool headstock.

FIG. 6 is an explanatory view illustrating operation of the tool headstock 100 of the present invention.

FIG. 6(a) illustrates a state that processing of the workpiece $K_1$ with the mill tool 110 arranged at the tool headstock 100 is completed.

FIGS. 6(b) and 6(c) illustrate operation to index a necessary turning tool by moving the tool headstock 100 in the direction of Y-axis while the comb-shaped cutting tool rest 150 is faced to the workpiece $K_1$ by rotating the tool headstock 100 about B-axis by 90 degrees.

FIG. 6(d) illustrates a state that turning processing is performed on the workpiece $K_1$ with a selected turning tool at the comb-shaped cutting tool rest 150.

FIG. 6(e) illustrates a state that turning processing is performed on a workpiece held by the second workpiece spindle 32 of the second workpiece headstock 30 after the tool headstock 100 is rotated about B-axis.

Figure 7:
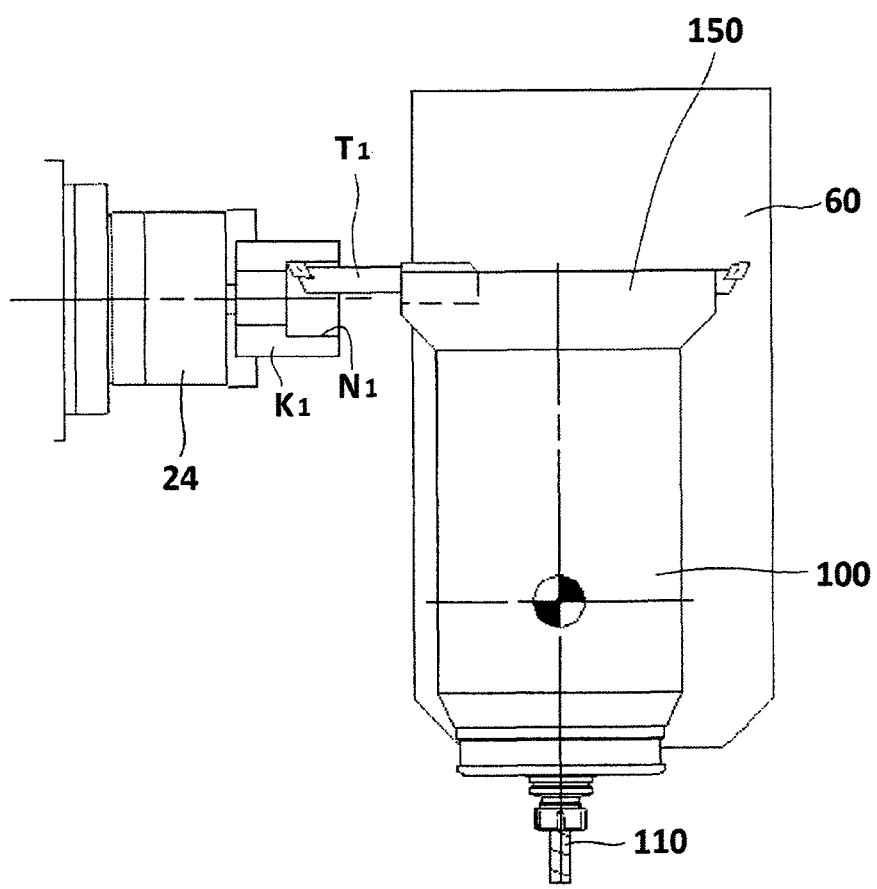
FIG. 7 is an explanatory view illustrating operation of the comb-shaped cutting tool rest.

FIG. 7 illustrates a state that a boring bar $T_1$ is arranged at the comb-shaped cutting tool rest 150.

Boring processing of an inner diameter portion $N_1$ can be performed on the workpiece $K_1$ by arranging the boring bar $T_1$.

Figure 8:
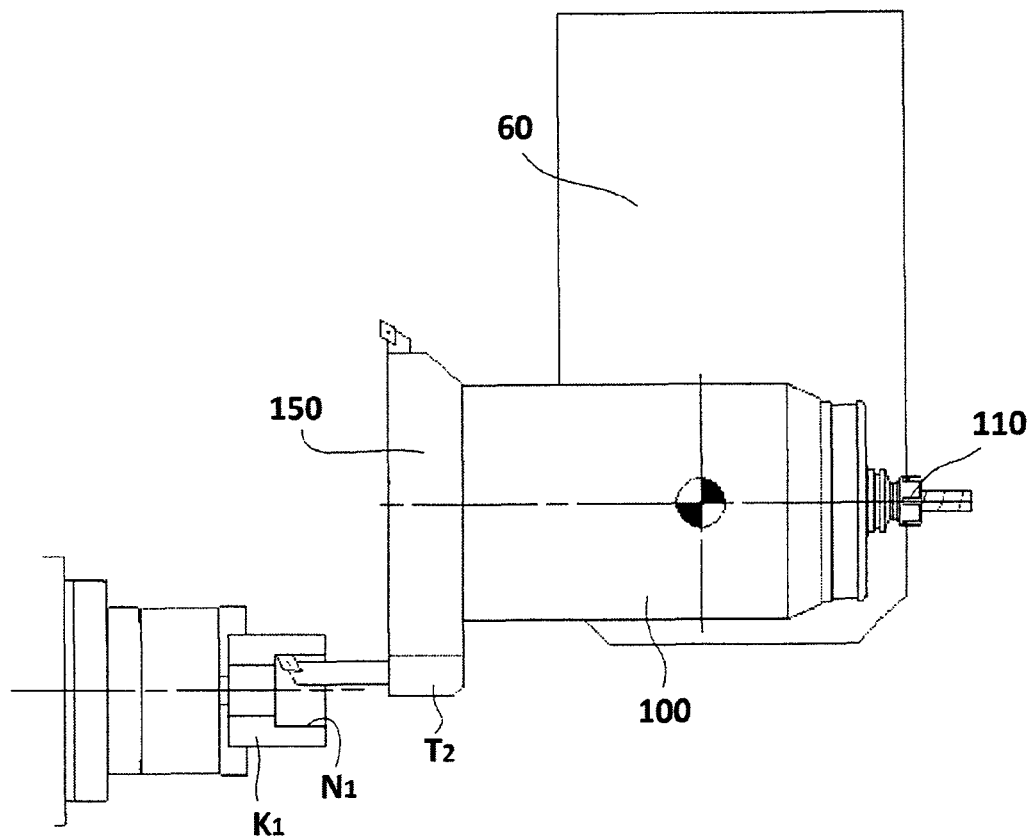
FIG. 8 is an explanatory view illustrating operation of the comb-shaped cutting tool rest.

FIG. 8 is an explanatory view illustrating another example of inner diameter turning with a boring bar.

A boring bar $T_2$ arranged at the comb-shaped cutting tool rest 150 has a bar extending in parallel to an axial line of the tool headstock 100 and performs turning processing of the inner diameter portion $N_1$ on the workpiece $K_1$.

A first workpiece headstock 20 is disposed to one end of a bed 10. The first workpiece headstock 20 is fixed onto the bed 10 and includes a first workpiece spindle 22.

A first workpiece spindle chuck 24 is disposed to the first workpiece spindle 22 to be rotationally driven as holding a workpiece $K_1$. Z-axis is defined on an axial line of the first workpiece spindle 22.

Figure 9:
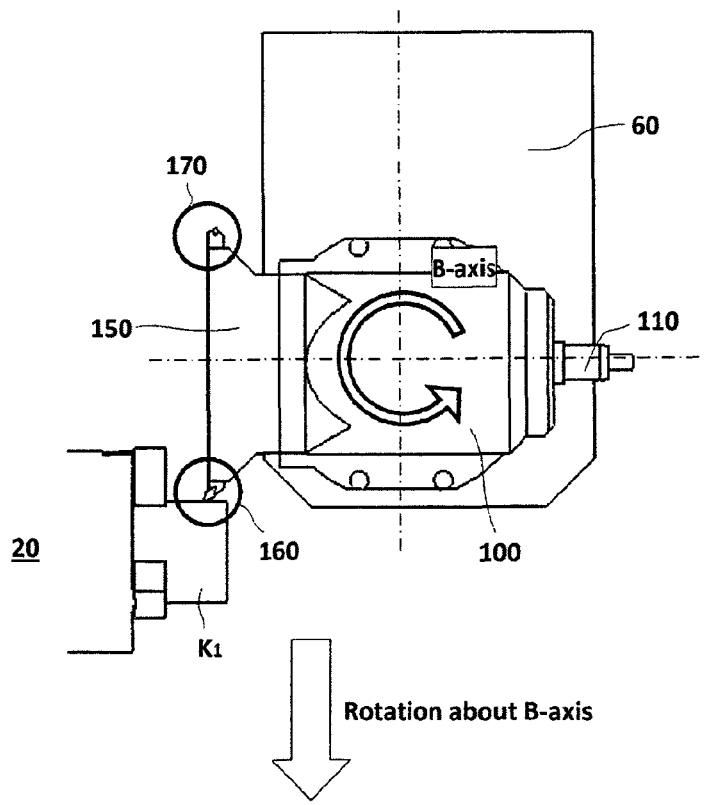
FIG. 9 is an explanatory view illustrating operation of the comb-shaped cutting tool rest.
Figure 9:
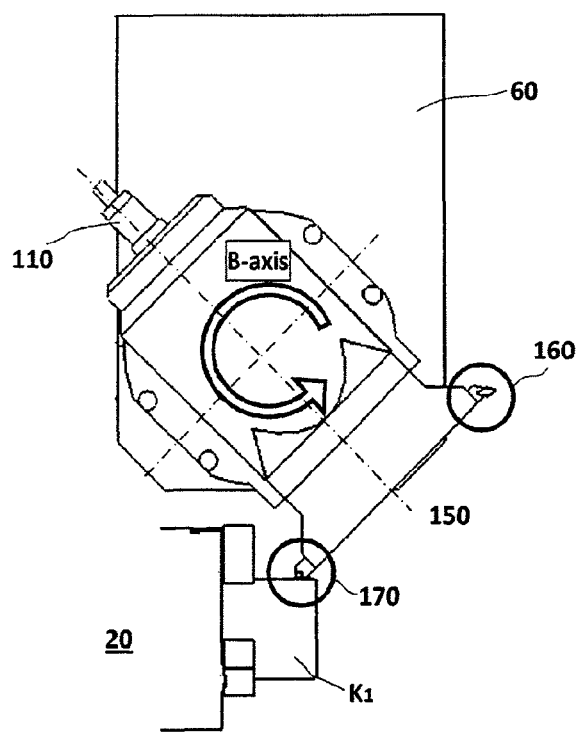

FIG. 9 illustrates a state in which turning processing is performed on the workpiece $K_1$ held at the first workpiece headstock 20 by utilizing the comb-shaped cutting tool rest 150.

The tool headstock 100 is rotated about B-axis so that the axis line thereof is oriented to be horizontal, and then, the workpiece $K_1$ is processed by utilizing the first turning tool rest 160 of the comb-shaped cutting tool rest 150.

It is also possible to perform processing by utilizing the second turning tool rest 170 of the comb-shaped cutting tool rest 150 after the tool headstock 100 is further rotating about B-axis.

With this structure, it becomes possible to utilize all tools on the first turning tool rest 160 and the second turning tool rest 170 of the comb-shaped cutting tool rest 150.

Accordingly, selection of an appropriate tool is facilitated. Further, an adjacent tool can be used instead of a worn tool, so that long-time working can be performed.

Since the composite working lathe 1 of the present invention has the above structure, time for changing turning tools can be reduced and processing efficiency can be improved.

Figure 10:
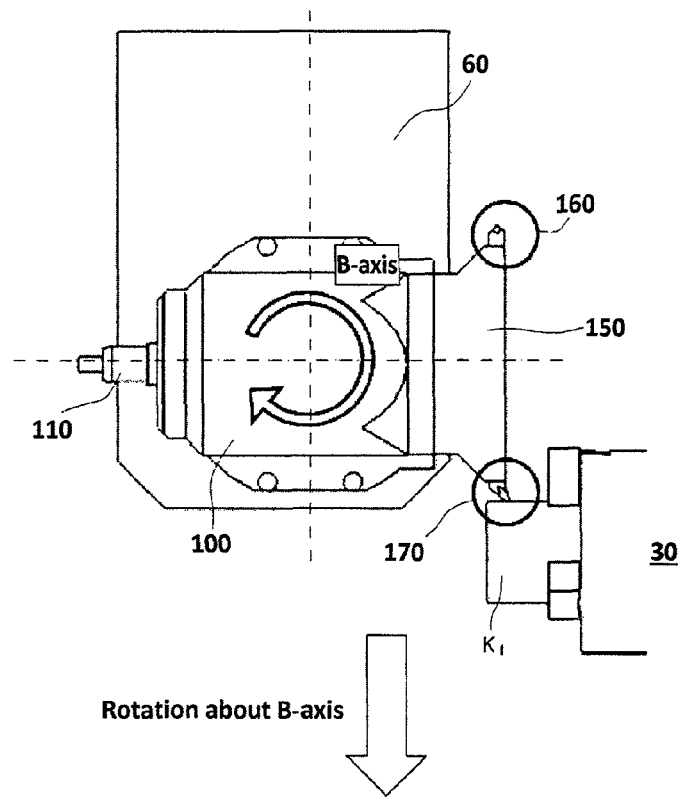
FIG. 10 is an explanatory view illustrating operation of the comb-shaped cutting tool rest for a second workpiece headstock.
Figure 10:
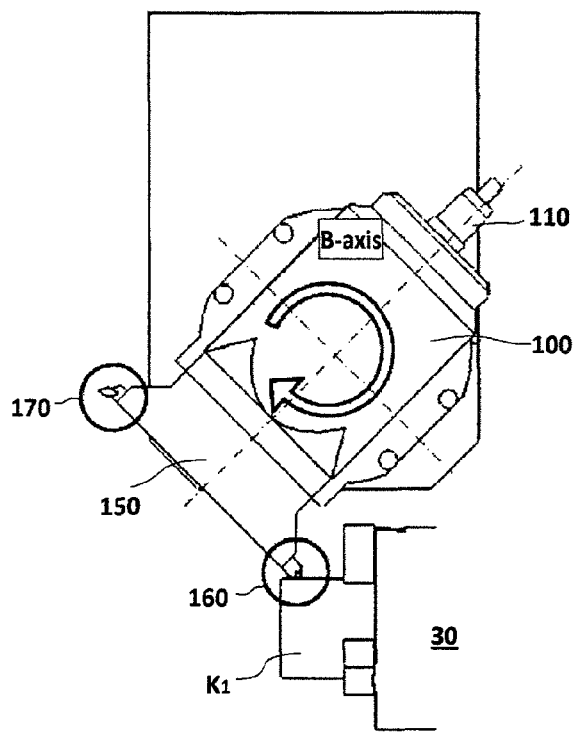

FIG. 10 illustrates a state that turning processing is performed on the workpiece $K_1$ held at the second workpiece headstock 30 with turning tools arranged at the comb-shaped cutting tool rest 150.

The tool headstock 100 is rotated about B-axis so that the comb-shaped cutting tool rest 150 is faced to the second workpiece headstock 30, and then, the workpiece $K_1$ is processed with the turning tools of the second turning tool rest 170.

In addition to performing turning processing on the workpiece $K_1$ by utilizing the turning tools of the second turning tool rest 170 of the comb-shaped cutting tool rest 150, it is also possible to utilize the first turning tool rest 160 after the tool headstock 100 is further rotated about B-axis.

Figure 11:
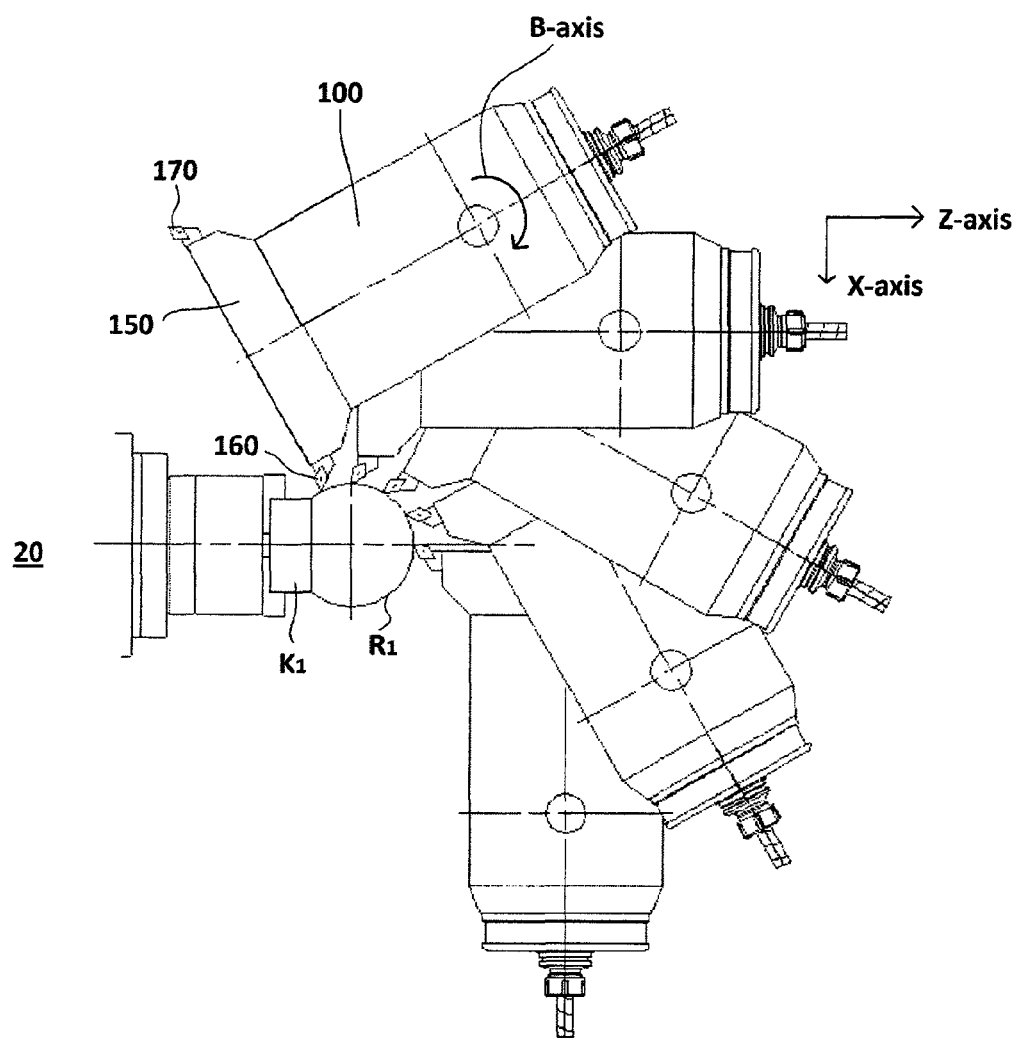
FIG. 11 is an explanatory view of curved-face processing.

FIG. 11 illustrates a state that processing of a curved-face $R_1$ is performed on the workpiece $K_1$ by utilizing the tool headstock 100 of the present invention. It is possible to perform processing of the curved-face $R_1$ on the workpiece $k_1$ by moving the tool headstock 100 in the directions of Z-axis and X-axis concurrently with rotation of the tool headstock 100 about B-axis.

Figure 12:
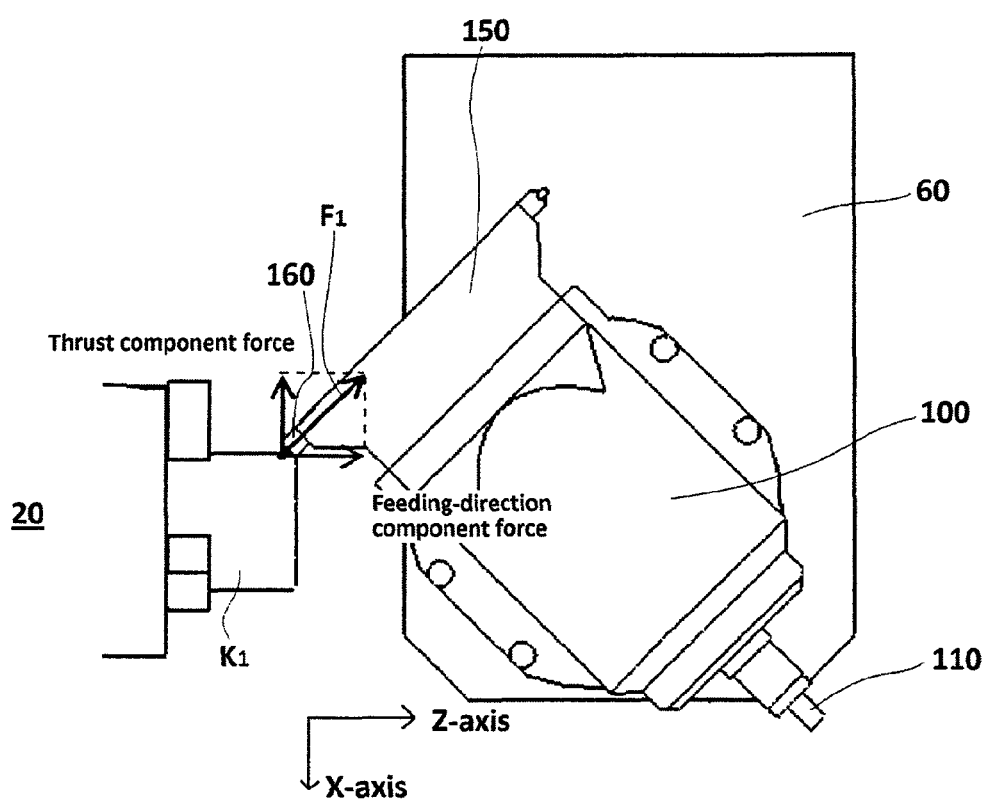
FIG. 12 is an explanatory view illustrating rigidity improvement of the tool headstock.

FIG. 12 is an explanatory view of an example capable of improving rigidity of the tool headstock 100 during turning processing by selecting posture of the tool headstock 100 around B-axis.

Resultant force $F_1$ of angular component force in the direction of X-axis and feeding-direction component force in the direction of Z-axis is received by the first turning tool rest 160 in the direction perpendicular to the axis line of the tool headstock 100. Accordingly, it is possible to improve the rigidity of the tool headstock 100 during processing.

DESCRIPTION OF REFERENCE NUMERALS 1, 1A Composite working lathe
10 Bed
20 First workpiece headstock
22 First workpiece spindle
24 First workpiece spindle chuck
30 Second workpiece headstock
32 Second workpiece spindle
34 Second workpiece spindle chuck
40 Carriage base
50 Carriage
52 Slide
60 Tool spindle base
100 Tool headstock
102 Tool spindle
110 Mill tool
150 Comb-shaped cutting tool rest
160 First turning tool rest
170 Second turning tool rest
200 Automatic edge position measuring device
$K_1$ Workpiece

The invention claimed is:

1. A composite working lathe, comprising:
a bed,
a first workpiece headstock which is placed at one end of the bed and which includes a workpiece spindle for rotating a workpiece about a Z-axis;
a second workpiece headstock which is placed at an opposite end of the bed; and
a tool headstock which is moved relative to the bed in the direction of the Z-axis, which is moved relative to the bed in the direction of an X-axis that is perpendicular to the Z-axis within a plane including the Z-axis, and which is moved relative to the bed in the direction of a Y-axis that is perpendicular to a plane formed by the Z-axis and the X-axis, and which is rotated relative to the bed about a B-axis that is perpendicular to the plane formed by the Z-axis and the X-axis;
wherein the tool headstock includes a tool spindle, to which tool spindle a rotating tool is attached in a replaceable manner to a front part of the tool spindle, and wherein the tool headstock includes a comb-shaped cutting tool rest which holds a plurality of turning tools, and wherein the comb-shaped cutting tool rest is arranged at a rear part of the tool spindle;
the comb-shaped cutting tool rest includes a first turning tool rest and a second turning tool rest, wherein the first turning tool rest and the second turning tool rest are on opposite sides of the B-axis;
wherein the first turning tool rest includes a plurality of the turning tools, each of the turning tools of the first turning tool rest being received in a respective opening between a respective pair of comb-tooth-like portions, and wherein the comb-tooth-like portions include a comb-tooth-like portion that forms, on opposite sides thereof, a respective wall of two of the openings;
wherein the second turning tool rest includes a plurality of the turning tools, each of the turning tools of the second turning tool rest being received in a respective opening between a respective pair of comb-tooth-like portions, and wherein the comb-tooth-like portions of the second turning tool rest include a comb-tooth-like portion that forms, on opposite sides thereof, a respective wall of two of the openings; and
wherein the plurality of turning tools held at the comb-shaped cutting tool rest are spaced along the direction of the Y-axis and are indexed to a processing position, for machining the workpiece, by moving the tool headstock in the direction of the Y-axis.

2. The composite working lathe according to claim 1, wherein the comb-shaped cutting tool rest holds an outer-diameter turning tool and an inner-diameter turning tool.

3. The composite working lathe according to claim 1, wherein the composite lathe is capable of performing the function of performing curved-face processing on a workpiece by moving the tool headstock in the directions of the Z-axis and the X-axis concurrently with rotating of the tool headstock about the B-axis in a state that one of the turning tools of the comb-shaped cutting tool rest of the tool headstock contacts the workpiece.

* * * * *